United States Patent
Roegiers

(10) Patent No.: US 7,659,349 B2
(45) Date of Patent: Feb. 9, 2010

(54) IMPACT STRENGTH POLYPROPYLENE

(75) Inventor: Kristien Roegiers, Wolvertem (BE)

(73) Assignee: Total Petrochemicals Research Feluy, Feluy (BE)

(*) Notice: Subject to any disclaimer, the term of this patent is extended or adjusted under 35 U.S.C. 154(b) by 292 days.

(21) Appl. No.: 11/401,189

(22) Filed: Apr. 10, 2006

(65) Prior Publication Data

US 2006/0258815 A1 Nov. 16, 2006

Related U.S. Application Data

(63) Continuation-in-part of application No. 10/495,320, filed as application No. PCT/EP02/12787 on Nov. 13, 2002, now abandoned.

(30) Foreign Application Priority Data

Nov. 14, 2001 (EP) .................. 01204356

(51) Int. Cl.
C08C 19/04 (2006.01)
C08L 23/00 (2006.01)
(52) U.S. Cl. .................. 525/333.7; 525/387; 525/240; 524/1; 524/401; 524/515
(58) Field of Classification Search .............. 525/333.7, 525/387, 240
See application file for complete search history.

(56) References Cited

U.S. PATENT DOCUMENTS

| | | |
|---|---|---|
| 3,887,534 A | 6/1975 | Baba et al. |
| 4,375,531 A | 3/1983 | Ross |
| 4,493,923 A | 1/1985 | McCullough, Jr. |
| 4,535,125 A | 8/1985 | McCullough, Jr. |
| 4,704,524 A | 11/1987 | Masaki et al. |
| 4,705,818 A | 11/1987 | Kawai et al. |
| 4,707,524 A | 11/1987 | Ehrig et al. |
| 4,734,448 A | 3/1988 | Kasahara et al. |
| 5,447,985 A | 9/1995 | DeNicola, Jr. et al. |
| 5,459,201 A | 10/1995 | Shroff et al. |
| 5,530,073 A | 6/1996 | Schoenberg |
| 5,602,206 A | 2/1997 | Gunesin et al. |
| 5,656,691 A | 8/1997 | Niki et al. |
| 5,705,568 A | 1/1998 | Gahleitner et al. |
| 5,741,862 A | 4/1998 | Muller et al. |
| 5,840,808 A | 11/1998 | Sugimura et al. |
| 5,932,660 A | 8/1999 | Meijer et al. |
| 6,015,854 A | 1/2000 | McCullough, Jr. |
| 6,358,435 B1 | 3/2002 | Schuurman et al. |
| 6,610,792 B2 | 8/2003 | Albe et al. |
| 6,723,829 B1 | 4/2004 | Malm et al. |
| 6,765,088 B1 | 7/2004 | Albe et al. |
| 2009/0171034 A1 | 7/2009 | VanDeurzen et al. |

FOREIGN PATENT DOCUMENTS

| | | |
|---|---|---|
| CA | 2110441 A1 | 12/1993 |
| EP | 0597461 A2 | 5/1994 |
| EP | 672712 A1 * | 3/1995 |
| EP | 0 710 700 A1 | 5/1998 |
| FR | 2 193 840 | 2/1974 |
| JP | 48079851 A1 | 10/1973 |
| JP | 07033916 | 2/1995 |
| KR | P19990075714 A1 | 10/1999 |
| WO | 96/20247 A1 | 7/1996 |
| WO | 98/20247 A1 | 7/1996 |
| WO | WO 96/20247 | 7/1996 |
| WO | WO 97/49759 | 12/1997 |
| WO | 96/03397 A1 | 2/1998 |
| WO | 01/36502 A1 | 5/2001 |
| WO | WO 01/36502 | 5/2001 |
| WO | 00/23434 A1 | 3/2003 |
| WO | WO 03/042257 | 5/2003 |

OTHER PUBLICATIONS

Ryu, S. H. et al: "Parameters Affecting Prcoess Efficiency of Peroxide-Initiated Controlled Degradation of Polypropylene" Advances in polymer Technology, John Wiley And Sons, Chichester, GB, vol. 11, No. 2, 1991, pp. 121-131, XP000323082; ISSN: 0730-6679.
VanDeurzen, Phillppe, et al., U.S. Appl. No. 12/398,635, filed Mar. 3, 2009, " Controlled Rheology Polypropylene Heterophasic Copolymers,".

* cited by examiner

*Primary Examiner*—Roberto Rábago
(74) *Attorney, Agent, or Firm*—Diane L. Kilpatrick-Lee

(57) ABSTRACT

Degraded polypropylene (co)polymer modified with a linear dialkylperoxide in order to retain its impact strength and a process for its preparation.

19 Claims, No Drawings

IMPACT STRENGTH POLYPROPYLENE

This application is a continuation-in-part of U.S. patent application Ser. No. 10/495,320, filed May 20, 2005, now abandoned, which was the National Stage of International Application No. PCT/EP02/12787, filed Nov. 13, 2002.

The present invention relates to polypropylene heterophasic copolymers modified with linear dialkylperoxides in order to better control their impact strength.

Several processes for increasing the impact strength of polypropylene (co)polymers are known in the art, for example, by modifying said (co)polymers with elastomeric modifiers or with peroxides.

Where an elastomeric modifier is used to modify the (co)polymers, it can be added in either of the following ways:
  reactor polymerisation of polypropylene heterophasic copolymers. These polypropylene heterophasic copolymers exhibit typical heterophasic morphology consisting of ethylene propylene bipolymer spherical domains dispersed in a semi-crystalline polypropylene matrix. This material consists generally of three components: a polypropylene homopolymer, a rubbery ethylene propylene bipolymer and a crystalline ethylene-rich ethylene propylene bipolymer. The amount and properties of the three component material are controlled by the process conditions. The mechanical properties of the final product are influenced for example by:
    1. the molecular weight, molecular weight distribution and tacticity of the propylene homopolymer matrix;
    2. the molecular weight and molecular weight distribution of the ethylene propylene rubber phase;
    3. the ethylene/propylene ratio of the ethylene propylene rubber phase;
    4. the content and dispersion of the optional ethylene rich ethylenpropylene bipolymer;
    5. the size and distribution of the rubber phase domains;
    6. the melt viscosity ratio of the propylene matrix and rubber phase components.
  Melt blending polypropylene (co)polymers with elastomeric modifiers to prepare polypropylene heterophasic copolymers. Elastomers such as ethylene propylene rubber (EPR) or ethylene propylene diene monomer (EPDM) provide improved impact behaviour. The impact resistance of these compositions depends. updn the content, the composition and the morphology of the elastomeric modifier.

Both methods have been described for example in: "Polypropylene, structure, blends and composites. Volume 2—Copolymers and blends. Edited by J. Karger-Kocsis, Published in 1995 by Chapman § Hall.

WO-95111938 discloses a process of modifying (co)polymers by contacting them with a peroxide compound containing an activated unsaturated group and an acid group in the presence of a polymer reinforcing material, or prior to the addition of a polymer reinforcing material. The primary object of that invention was to modify (co)polymers in order to introduce an adhesion promoting functional group and to improve their properties. The resulting modified (co)polymers have improved impact strength, flexural strength, tensile strength and elongation at break, increased melt flow index and the other properties equal those of the unmodified impact (co)polymers.

WO-97/49759 discloses a process for enhancing the melt strength of a propylene (co)polymer by the steps of:
  mixing an initiator with the propylene (co)polymer at a temperature below the decomposition temperature;
  then heating the mixture above the initiator decomposition temperature in order to decompose the initiator before the polymer has melted and in order to react the radicals created by the decomposition with the polymer.

WO-96/03444 discloses a process for modifying (co)polymers by contacting these with an organic peroxide, some of said peroxide being decomposed. Cyclic ketone peroxides have been found particularly efficient in the modification processes. They have been employed in the degradation of polyolefins, the cross-linking of polyolefins, the dynamic cross-linking of blends of elastomers and thermoplastic polymers, the grafting of monomers onto polymers, or the functionalisation of polyolefins. The resulting modified (co)polymers had a larger melt flow index, a lower weight average molecular weight and a narrower molecular weight than the starting (co)polymers, while keeping an adequate melt strength.

WO-00123434 discloses a composition comprising a cyclic ketone peroxide and a phlegmatizer having a 95% boil-off point falling in the range of 220-265° C. Preferably, the peroxide is a cyclic ethyl ketone peroxide and a single 95 phlegmatiser is used.

U.S. Pat. No. 4,707,524 discloses the use of peroxides that do not decompose to tert-butyl alcohol and have a half-life time in the range of 1 to 10 hours at 128° C. for controlling the molecular weight and molecular weight distribution of polypropylene.

WO-96/20247 discloses cross-linked polymer compositions of propyleneethylene copolymer and ethylene-a-olefin copolymer prepared by melting and kneading the constituents in the presence of a radical forming agent, a cross-linking agent and eventually a peroxide inhiinhibitor. These compositions were characterised by a high impact strength and a high flexural modulus.

EP-0,208,330 discloses a propylene polymer composition with increased whitening resistance and increased impact strength, obtained by addition of an ester, in the presence of a peroxide, during extrusion.

None of these prior art documents discloses polypropylene heterophasic copolymers having simultaneously a melt flow index MI2 larger than 15 g/10 min and increased impact strength, while keeping adequate rigidity.

It is an aim of the present invention to provide polypropylene heterophasic copolymers exhibiting simultaneously high melt flow index and high impact strength.

It is also an aim of the present invention to provide polypropylene heterophasic copolymers exhibiting high impact strength for high degradation rates.

It is another aim of the present invention to provide polypropylene heterophasic copolymers with very high impact resistance over a large range of temperatures.

It is a further aim of the present invention to obtain polypropylene heterophasic copolymers with controlled rheology.

It is yet another aim of the present invention to obtain a material with an optimal balance of flexural modulus, impact strength and melt flow.

This invention discloses a polypropylene (co)polymer degraded with a linear dialkyl peroxide of the general formula:

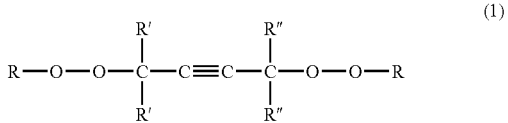

(1)

wherein:
each R is the same or different and is a hydrocarbon or a carboxy or a heteroatom and each R' or R" is the same or different and is an alkyl having one or more carbon atoms or an aryl, with the restriction that at least one R' and at least one R" is an alkyl having one or more carbon atoms, or of the general formula:

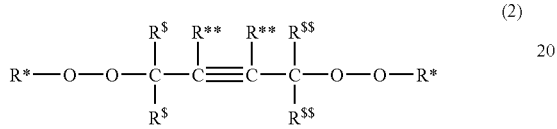

(2)

wherein:
each R* is the same or different and is a hydrocarbon or a carboxy or a heteroatom and each $R^\$$ or $R^{\$\$}$ or R** is the same or different and is an alkyl having one or more carbon atoms or an aryl with the restriction that at least one $R^\$$ and at least one $R^{\$\$}$ is an alkyl having one or more carbon atoms, said polypropylene retaining an Izod notched impact strength larger than 20 kJ/m² for melt flow indices larger than 15 g/10 min and degradation rates larger than 5.

The degradation rate is defined in terms of the ratio of the melt index of the degraded material with respect to the melt index of the initial fluff material. The degradation rate may be defined as the ratio $MI2_{degraded}/MI2_{fluff}$ wherein $MI2_{fluff}$ is the melt index MI2 of the starting polymer fluff before degradation and $MI2_{degraded}$ is the melt index MI2 of the degraded polymer. The degradation rate $MI2_{degraded}/MI2_{fluff}$ is at least 5, preferably it is at least 10, and more preferably the degradation rate is at least 20.

Preferably, the degraded polypropylene (co)polymer of the present invention retains an Izod notched impact strength that is larger than 30 kJ/m² and more preferably larger than 40 kJ/m² for values of the melt index larger than 15 g/10 min.

This invention also discloses the use of linear dialkyl peroxide having a backbone containing at least 6 carbon atoms and a double or triple bond, to degrade a polypropylene (co) polymer, for producing a controlled rheology material having an impact resistance larger than 20 kJ/m² for values of the melt index MI2 larger than 15 g/10 min.

The half-life of the linear dialkyl peroxides of the present invention is measured for a 0.2 molar solution in benzene. The half-life temperature of a peroxide is defined as the temperature required to decompose half of the molecules in one hour, and thus a less reactive peroxide is characterised by a higher half-life temperature. The half-life temperature is typically higher than 140° C., preferably, it is higher than 145° C. and most preferably, it is about 149° C.

A longer half-life temperature has two favourable consequences:

1. the peroxide decomposes more slowly; there is thus more time for mixing with the polymer melt in the extruder resulting in a more homogeneous material;

2. there is at any time a lower radical concentration, reducing the probability of side reactions.

Reducing the extrusion temperature increases the half-life temperature of the peroxide.

The melt index MI2 is measured using the method of standard test ISO 1133 at 230° C. and under a load of 2.16 kg, the flexural modulus is measured using the method of standard test ISO 178 and the impact strength is the Izod notched impact strength measured according to the methods of standard test ISO 180.

The process for preparing a controlled theology polypropylene heterophasic copolymer by degrading a polypropylene with a linear dialkyl peroxide having a backbone containing at least 6 carbon atoms and a double or triple bond, comprises the steps of:

either (a) Reactor polymerising a polypropylene heterophasic copolymer;

(b) Exruding the polypropylene heterophasic copolymer of step (a) with said dialkyl peroxide having a backbone containing at least 6 carbon atoms and a double or triple bond, and optionally with one or more filler(s), in an extruder, at a temperature Extruding the polypropylene heterophasic copolymer of step a), with said linear sufficient to maintain the copolymer in the molten state; or Extruding a polypropylene (co)polymer with said linear dialkyl peroxide having a backbone containing at least 6 carbon atoms and a double or triple bond, optionally with one or more elastomeric modifier(s) and/or one or more filler(s), in an extruder, at a temperature sufficient to maintain the copolymer in the molten state.

The specific group of linear dialkyl peroxide having a backbone containing at least 6 carbon atoms, and a double or a triple bond, and a half-life temperature higher than 140° C. for decomposing half of the molecules in one hour, can be represented by either of the general formulas:

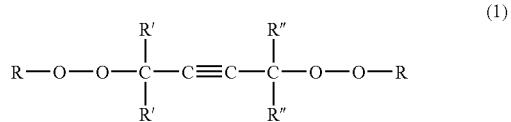

(1)

wherein:
each R is the same or different and is a hydrocarbon or a carboxy or a heteroatom, and each R' or R" is the same or different and is an alkyl having one or more carbon atoms or an aryl, with the restriction that at least one R' and at least one R" is an alkyl having one or more carbon atoms

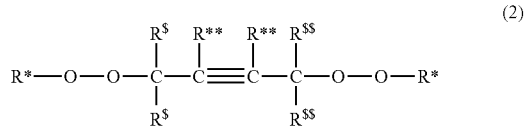

(2)

wherein:
each R* is the same or different and is a hydrocarbon or a carboxy or a heteroatom and each $R^\$$ or $R^{\$\$}$ or R is the same or different and is an alkyl having one or more carbon atoms or an aryl with the restriction that at least one R$^\$$ and at least one R$^{\$\$}$ is an alkyl having one or more carbon atoms, Preferably, the peroxide is a linear dialkyl peroxide containing at least two peroxide goups and wherein each of R' and R" or each of R, R$^\$$ and R$^{\$\$}$ is an alkyl, more preferably a methyl. When all the substituents R' and R" or R**, R$^\$$ and R$^{\$\$}$ are methyl, the linear dialkyl peroxide has an hexyne or an hexene backbone. Most preferably, it is 2,5-dimethyl-2,5-di(tert-butyl-peroxy)-hexyne-(3).

The treatment of a polypropylene with peroxide generally produces a modified polymer by creation of functional groups. Peroxide radicals can cause chain scission and/or cross-linking, resulting in an increase of the melt flow index. It must be noted however that increasing the degradation ratio causes a decrease of the flexural modulus. The amount of peroxide necessary to carry out the invention depends upon the chemical nature of the peroxide, upon the starting melt flow index and upon the desired final melt flow index: it is directly proportional to the final melt flow index. Melt flow index of from 2 to 70 g/10 min have been obtained, but the efforts of the present invention are focused on products having a melt flow index larger than 15 g/10 min and a degradation rate larger than 5. The main departure from the strength and stiffness behaviour of prior art materials occurs for resins having a melt flow index above 15 g/10 min.

In a preferred embodiment of the present invention, the polypropylene heterophasic copolymer is prepared by copolymerising propylene. with ethylene in the proportions of from 5 to 20 wt % of ethylene and 95 to 80 wt % of propylene. The copolymerisation is effected in two reactors as follows:

(a) the catalyst and propylene are charged into a first loop reactor equipped with a circulation pump, at a temperature of from 60 to 80° C. and under a pressure of from 35 to 40 bars, using the liquid monomer as a suspension vehicle, in order to produce a homopolymer of propylene on the surface of the catalyst grains;

(b) the polymer-coated catalyst grains are transferred to one or more secondary gas phase reactors with a fluidised bed and ethylene is added in order to produce an ethylene-propylene rubber.

The polypropylene heterophasic copolymer so obtained has a typical heterophasic morphology consisting of ethylene-propylene bipolymer spherical domains dispersed in a semi-crystalline polypropylene matrix. These materials generally consist of three components: a propylene homopolymer, a rubbery ethylene-propylene bipolymer and a crystalline ethylene-rich ethylene-propylene bipolymer. The amount and properties of the components are controlled by the process conditions and the physical properties of the resulting material are correlated to the nature and amount of the three components. In the present invention, the preferred amount of ethylene is of from 9 to 15 wt % and more preferably, it is from 11 to 14 wt %.

The polypropylene heterophasic copolymer is then extruded in an extruder with a linear dialkyl peroxide and with one or more optional fillers, such as glass fillers, talc, calcium carbonate or clay minerals. The linear dialkyl peroxide has a half-life temperature higher than 140° C. for decomposing half of the molecules in one hour. The extrusion is carried out at a temperature that is just sufficient to maintain the material in a molten state. In the examples carried out with the preferred peroxide of the present invention, the extrusion temperatures are typically of from 160° C. to 200° C., preferably of from 160 to 190° C.

The resin obtained after degradation of the polypropylene (co)polymer at low temperature exhibit an excellent impact performance. That result is totally unexpected as it is generally known in the art to work at temperatures higher than 200° C. with high half-life temperature peroxides, in order to compensate for their low reactivity level. It must be noted in addition that the resins prepared according to the present invention retain higher impact strength than prior art resins, for extrusion temperatures higher than 200° C.

The Izod notched impact strength of the final resin depends upon the amount of ethylene present in the polypropylene heterophasic copolymer: it increases with increasing amounts of ethylene. The rigidity, on the contrary, decreases with increasing amounts of ethylene, thereby imposing an upper limit to the amount of ethylene incorporated into the copolymer.

It is further observed, that the final resins obtained according to the present invention, when extruded at cold temperature, retain an Izod notched impact strength at 23° C. above 40 kJ/m$^2$, for melt flow indices ranging from 15 to 40 g/10 min and for an ethylene content of from 9 to 15 wt % in the polypropylene heterophasic copolymer. For an ethylene content in the polypropylene heterophasic copolymer larger than 12 wt % and an extrusion temperature of at most 200° C., the impact strength of the compositions according to the present invention remains above 40 kJ/m$^2$ for melt flow indices up to 70 g/10 min. Throughout this disclosure, cold extrusion temperature is understood as a temperature ranging from the temperature at which all components are in the molten state up to a temperature of less than 200° C.

In addition, it is also observed that both the extrusion temperature and the percentage of ethylene contained in the polypropylene heterophasic copolymer have an influence on the behaviour of the Izod notched impact strength, as a function of melt flow index. Decreasing the extrusion temperature and/or increasing the amount of ethylene results in final resins that retain the impact properties at values of the melt flow index larger than 40 g/10 min. It is thus possible, playing with these two parameters to tailor the desired final resins.

In terms of the ethylene content, the degraded copolymer is characterized by an impact strength that decreases when the melt flow index reaches a threshold value that increases with an increasing polyethylene content. In terms of extrusion temperature, the degraded copolymer is characterized by an impact strength that decreases when the melt flow index reaches a threshold value that increases with decreasing extrusion temperature.

The copolymers of the present invention are used in several applications that require simultaneously a melt flow index larger than 15 g/10 min, high impact strength and high flexural modulus such as for example: crates, ice cream containers, yoghurt beakers, storage bins, suitcases, lids, pails, technical parts, garden articles, automotive parts, batteries, thin wall packaging, medical waste containers and compounds. Compounds are particularly valuable as they allow the production of articles with less or no elastomeric modifiers thereby allowing reduction of cost and processing time.

EXAMPLES

Several samples were prepared using as starting material a polypropylene heterophasic copolymer having a melt flow value MI2 of 2 g/10 min and an ethylene content of from 10.5 to 12.5 wt %. The polypropylene heterophasic copolymer has been extruded in a single-screw Gloenco extruder with various peroxides in order to obtain the desired melt flow index for the finished material. The formulation of these materials contains in addition 500 ppm of Irganox 1010, 500 ppm of Irgafos 168, 400 ppm of calcium stearate, 3500 ppm of talc and 2000 ppm of Atmer 129.

Two temperature profiles were used on the Gloenco extruder:
normal temperature profile of 180-200-200-200-200° C.
low temperature profile of 170-170-170-170-170° C.

The following peroxides were used:

a diluted linear peroxide with a long half-life temperature sold by ATOFINA under the name Luperox® 130M085: 2,5-dimethyl-2,5-di-(tert-butylperoxyl)-hexyne(3);

a linear peroxide diluted into mineral oil sold by ATOFINA under the name Luperox® 101 and diluted 50% in Esso Primol 32: 2,5-dimethyl-2,5-di(tert-b utylperoxyl)-hexane;

a linear peroxide with a short half-life temperature sold by ATOFINA under the name Luperox® 802PP40: di(2-tert-butylperoxypropyl-(2))-benzene;

a linear peroxide with a short half-life temperature sold by Akzo Nobel Chemicals B.V. under the name Trigonox® 101: 2,5-di-tert-butyl-2,5-dimethyl peroxide;

a diluted linear peroxide with a long half-life temperature sold by ATOFINA under the name Luperox® DIM050 and diluted 50% in mineral oil: di-tert-butyl-peroxide.

a cyclic peroxide with a long half-life temperature sold by Akzo Nobel Chemicals B.V. under the name Trigonox® 301: 3,6,9-triethyl-3,6,9-trimethyl-1,4,7-triperoxonane.

The properties of these five peroxides are summarised in Table I

TABLE I

| Peroxide | Luperox 1301085 | Luperox 101 | Luperox 802PP40 | Trigonox 101 | Luperox D1 | Trigonox 301 |
|---|---|---|---|---|---|---|
| Active oxygen | 9.5 | 10 | 3.8 | 10% | 10.9 | 7. |
| Half-Life[a] | 14 | 138 | 146 | 138 | 149 | 14 |

[a]The half-life temperature is measured by the temperature at which half of the molecules of peroxide are decomposed after one hour in a solution 0.2 molar benzene.

The flexural modulus was measured at 23° C. using the method of standard test ISO 178 and the Izod notched impact strength was measured respectively at 23° C., 10° C. and −20° C. using the method of standard test ISO 180.

The amounts of peroxide were adjusted in order to obtain the target MI2's of 12, 25 and 40.

The results are summarized in Tables II to VII.

TABLE II

Granulation with Luperox 130MO85.

| Target MI2 (g/10 min) | 12 | 25 | 40 | 12 | 25 | 40 |
|---|---|---|---|---|---|---|
| MI2 (g/10 min) | 11.2 | 21.1 | 37.8 | 10 | 26.4 | 35.4 |
| MI2 real[a] (g/10 min) | 7.2 | 14.2 | 21.8 | 5 | 13.3 | 17.4 |
| Extrusion temperature (° C.) | Normal | Normal | Normal | Low | Low | Low |
| Flexural Modulus (Mpa) | 1080 | 1040 | 1007 | 1082 | 1023 | 999 |
| Izod at 23° C. (kJ/m²) | 52 | 47.7 | 43.1 | 54.1 | 48.9 | 45.8 |
| Izod at 10° C. (kJ/m²) | 15.4 | 12.8 | 11.4 | 43.9 | 13.8 | 12.9 |
| Izod at −20° C. (kJ/m²) | 7.8 | 7.3 | 7 | 7.9 | 7.6 | 7 |

[a]MI2 real stands for MI2 of the polymer after granulation: it can be evaluated by an indirect technique such as Gel Permeation Chromatography (GPC).

TABLE III

Granulation with Luperox 101 50% diluted in mineral oil.

| Target M12 (g/10 min) | 12 | 25 | 40 | 12 | 25 | 40 |
|---|---|---|---|---|---|---|
| M12 (g110 min) | 12.2 | 24.7 | 40.6 | 11.6 | 24.7 | 34.3 |
| M12 lrg (g110 min) | 9.5 | 18.1 | 27.6 | 8.1 | 15.2 | 18.0 |
| Extrusion temperature (° C.) | Normal | Normal | Normal | low | Low | Low |
| Flexural Modulus (Mpa) | 1044 | 1006 | 964 | 1073 | 1008 | 963 |
| Izod at 23° C. (kJ/m²) | 45.9 | 18.4 | 13.7 | 47.2 | 19.8 | 16.3 |
| Izod at 10° C. (kJ/m²) | 13.4 | 11.1 | 9.8 | 13.5 | 11.5 | 9.8 |
| Izod at −20° C. (kJlm²) | 6.8 | 6.1 | 6.2 | 7.2 | 6.6 | 6.5 |

TABLE IV

Granulation with Luperox 802PP40.

| Target MI2 (g10 min) | 12 | 25 | 40 | 12 | 25 | 40 |
|---|---|---|---|---|---|---|
| MI2 (g110 min) | 11.0 | 23.5 | 40.1 | 13.5 | 25.2 | 36.6 |
| MI2 lrg (10 min) | 8.7 | 16.9 | 27.7 | 6.7 | 11.5 | 18.4 |
| Extrusion temperature | Normal | Normal | Normal | low | Low | Low |
| Flexural Modulus (Mpa) | 1067 | 1015 | 992 | 1029 | 1013 | 994 |
| Izod at 23° C. (kJlm²) | 45.3 | 17.2 | 13.3 | 47.6 | 21.2 | 16.5 |
| Izod at 10° C. (kJlml) | 12.2 | 10.6 | 9.3 | 14.0 | 11.3 | 10.1 |
| Izod at −20° C. (kJ/m²) | 7.2 | 6.8 | 5.9 | 7.5 | 6.3 | 6.3 |

TABLE V

Granulation with Trigonox 101.

| Target MI2 (g10 min) | 12 | 25 | 40 | 12 | 25 | 40 |
|---|---|---|---|---|---|---|
| Extrusion temperature | Normal | Normal | Normal | low | Low | Low |
| Flexural modulus (Mpa) | 1050 | 1040 | 1102 | 1043 | 1000 | 962 |
|  | 19 | 20.7 | 13.3 | 47 | 24 | 14 |
| Izod at 10° C. (kJlm²) | n.a.[1] | n.a. | n.a. | 12.7 | 9.9 | 8 |
| Izod at 20° C. (kJlm²) | 6 | 7.6 | 6.9 | 6.1 | 5.8 | 4.8 |

TABLE VI

Granulation with Luperox DIMO50.

| Target M12 (g/10 min) | 12 | 25 | 40 | 12 | 25 | 40 |
|---|---|---|---|---|---|---|
| Extrusion temperature | Normal | Normal | Normal | Low | Low | Low |
| Flexural modulus (Mpa) | 1062 | 1018 | 1001 | 1084 | 1007 | 966 |
| Izod at 23° C. (kJ/m²) | 46.9 | 29.3 | 15.8 | 53.5 | 38.4 | 17.6 |
| Izod at 10'0 C. (kJ/m²) | 12.4 | 12.1 | 11.0 | 16.1 | 12.2 | 10.8 |
| Izod at −20° C. (kjm') | 7.0 | 6.4 | 6.2 | 7.7 | 6.9 | 6.8 |

TABLE VII

| Granulation with Trigonox 301. | | | | | | |
|---|---|---|---|---|---|---|
| Target MI2 (g10 min) | 12 | 25 | 40 | 12 | 25 | 40 |
| Extrusion temperature | Normal | Normal | Normal | Low | Low | Low |
| Flexural modulus (Mpa) | 1120 | 1065 | 1136 | 1073 | 1012 | 989 |
| Izod at 23° C. (kJ/m$^2$) | 54 | 51 | 21.1 | 51.5 | 47.5 | 45 |
| Izod at 10° C. (kJ/m$^2$) | n.a.[1] | n.a. | n.a. | 43.1 | 12.8 | 10.7 |
| Izod of 20° C. (kJIm$^2$) | 6.5 | 7.2 | 8.2 | 6.4 | 6.1 | 6.1 | n.a.: not available

It can be concluded from these examples and data that a polypropylene degraded with the linear dialkyl peroxides according to the present invention exhibits outstanding impact properties for values of melt flow index larger than 15 g/10 min, quite contrary to observations made on polypropylene degraded with conventional linear peroxides. It compares also advantageously with a polypropylene degraded with a cyclic ketone peroxide as can be seen by comparing the Izod results of Tables II and V. In addition, it is observed by comparing these same two tables, that the impact performance of the degraded polypropylene is less sensitive to the extrusion temperature. The impact strength of a polypropylene degraded with a cyclic ketone peroxide begins to significantly loose its impact strength when it is extruded with the cyclic peroxide at a temperature of 200° C.: the Izod notched impact strength at 23° C. falls to 21.1 kJ/m$^2$ for a MI2 of 40 g/10 min. For the degraded polypropylene according to the present invention, extruded with a linear dialkyl peroxide at 200° C., the Izod impact strength at 23° C. retains a value of 43.1 kJ/m$^2$ for a M12 of 40 g/10 min.

The half-life temperature of the peroxide used to degrade the polypropylene plays a significant role in the impact behaviour of the degraded material but other factors are at play as can be seen by comparing Tables II and VI. The peroxide Luperox DI has exactly the same half-life temperature of 149° C. as Luperox 130; it exhibits better impact performances than other peroxides having low half-life temperatures but it does not match the performances of Luperox 130 for melt flow indices larger than 25 g/10 min. The half-life temperature, although very important, is thus not the only determining factor in the determination of the impact strength of the degraded material, and the chemical structure of the peroxide molecule also influences the end results.

The linear dialkyl peroxide used in the present invention has the further advantage of producing the desired degradation level, i.e. the desired melt flow index with a smaller amount of peroxide than the cyclic ketone peroxide Trigonox 301. The consumption (expressed in ppm) of these two peroxides for obtaining polypropylene with desired degradation levels is displayed in Table VIII.

TABLE VIII

| MI2 | Trigonox 301 | Luperox 130M085 |
|---|---|---|
| 12 g/10 min | 480 ppm | 270 ppm |
| 25 g/10 min | 970 ppm | 485 ppm |
| 40 g/10 min | 1420 ppm | 750 ppm |

It must be noted that the percentage of active oxygen of the Luperox 130MO85 is larger than that of the Trigonox 301, thereby at least partly responsible for that difference in consumption.

From these examples, it can be concluded that the linear dialkyl peroxides with an hexyne or an hexene backbone offers an important mechanical advantage over conventional linear peroxides such as Trigonox 101 or Luperox 101 and over cyclic ketone ketone peroxides such as Trogonox 301.

It is possible to produce better flow materials that keep their impact strength for a melt flow index as high 70 g/10 min as observed from the Izod notched impact test at room temperature. The materials also show a better impact performance at lower temperatures, down to –20° C.

The flexural modulus is higher in most cases.

In conclusion, the resins produced according to the present invention exhibit an improved balance of stiffness, impact, strength and flow properties. The materials produced according to the present invention are thus particularly useful for preparing articles that require simultaneously high melt flow and good impact strength. Indeed high melt flow material is easier and faster to process, particularly in injection moulding, thus allowing shorter cycle time and reduction of the walls' thickness while keeping an acceptable stiffness and impact strength.

What is claimed is:

1. A degraded polypropylene (co)polymer produced by degrading a precursor polypropylene copolymer with a linear dialkyl peroxide having a double or triple bond, said degraded polypropylene copolymer retaining an Izod notched impact strength larger than 20 kJ/m$^2$ at a temperature of 23° C. and having a melt flow index greater than 15 g/10 min. and a degradation rate MI2$_{degrade}$/MI2$_{fluff}$ larger than 5, and wherein said copolymer is a polypropylene heterophasic copolymer containing from 5-20 wt. % of ethylene.

2. The degraded polypropylene (co)polymer of claim 1 characterized by a degradation rate MI2$_{degraded}$/MI2$_{fluff}$ of at least 10.

3. The degraded polypropylene (co)polymer of claim 1 characterized by a degradation rate MI2$_{degraded}$/MI2$_{fluff}$ of at least 20.

4. The degraded polypropylene (co)polymer of claim 1 characterized by an Izod notched impact strength greater than 30 kJ/m$^2$ at 23° C.

5. The degraded polypropylene (co)polymer of claim 1 characterized by an Izod notched impact strength greater than 40 kj/m$^2$. at 23° C.

6. The degraded polypropylene (co)polymer of claim 1 wherein said copolymer contains from 9 to 15 wt. % of ethylene.

7. The degraded polypropylene (co)polymer of claim 1 wherein said copolymer contains from 11 to 14 wt. % of ethylene.

8. The degraded polypropylene (co)polymer of claim 1 wherein said linear dialkyl peroxide has at least two peroxide groups and a hexene or hexyne backbone.

9. The degraded polypropylene (co)polymer of claim 8 wherein said linear dialkyl peroxide is characterized by the formula:

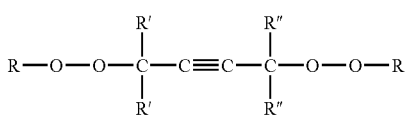

(1)

wherein:
each R is the same or different and is a hydrocarbon or a carboxy or a heteroatom, and each R' or R" is the same or different and is an alkyl group having one or more carbon atoms or an aryl group, provided that at least one R' and at least one R" is an alkyl group having one or more carbon atoms or the formula:

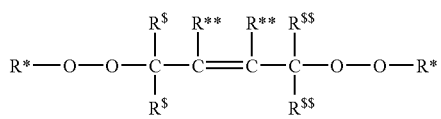

(2)

wherein:
each R* is the same or different and is a hydrocarbon or a carboxy or a heteroatom, each $R^\$$, $R^{\$\$}$ or R** is the same or different and is an alkyl group having one or more carbon atoms or an aryl group provided that at least one $R^\$$ and at least one $R^{\$\$}$ is an alkyl group having one or more carbon atoms.

10. The degraded polypropylene (co)polymer of claim 9 wherein the peroxide is a linear dialkyl peroxide containing at least two peroxide groups and where each of R' and R" or each of R**, $R^\$$ and $R^{\$\$}$ is an alkyl group.

11. The degraded polypropylene (co)polymer of claim 10 wherein each of the substituents R' and R" or R**, $R^\$$ and $R^{\$\$}$ is a methyl group and the linear dialkyl peroxide has a hexyne or a hexene backbone.

12. The degraded polypropylene (co)polymer of claim 8 wherein the linear dialkyl peroxide is 2,5-dimethyl-2,5-di(tert-butyl-peroxy)-hexyne(3).

13. A process for producing a degraded polypropylene (co)polymer comprising:
providing a precursor polypropylene (co)polymer;
extruding said precursor polypropylene (co)polymer with a linear dialkyl peroxide having a double or triple bond in an extruder at a temperature sufficient to maintain said (co)polymer in a molten state and which does not exceed 200° C. to produce a degraded polypropylene (co)polymer having an Izod notched impact strength greater than 20 kJ/m² at a temperature of 23° C. and having a melt flow index greater than 15 g/10 min. and a degradation rate $MI2_{degraded}/MI2_{fluff}$ larger than 5, and wherein said copolymer is a polypropylene heterophasic copolymer containing from 5-20 wt.% of ethylene; and recovering said degraded polypropylene (co)polymer from said extruder.

14. The process of claim 13 wherein said extruder is operated at a temperature within the range of 160-200° C.

15. The process of claim 14 wherein said extruder is operated at a temperature within the range of 160-190° C.

16. The process of claim 13 wherein said polypropylene (co)polymer precursor incorporates at least one of an elastomeric modifier and a particulate filler selected from the group consisting of glass, talc, calcium carbonate, and a clay mineral.

17. The process of claim 14 wherein said (co)polymer is extruded with a filler selected from the group consisting of a glass, talc, calcium carbonate, and a clay mineral.

18. The process of claim 17 wherein the linear dialkyl peroxide has at least two peroxide groups and a hexene or hexyne backbone.

19. The process of claim 18 wherein the linear dialkyl peroxide is 2,5-dimethyl-2,5-di(tert-butyl-peroxy)-hexyne (3).

* * * * *